United States Patent
Becker

(10) Patent No.: US 10,452,117 B1
(45) Date of Patent: Oct. 22, 2019

(54) PROCESSOR ENERGY MANAGEMENT SYSTEM

(71) Applicant: Apple Inc., Cupertino, CA (US)

(72) Inventor: Daniel U. Becker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 15/272,975

(22) Filed: Sep. 22, 2016

(51) Int. Cl.
  *G06F 1/32* (2019.01)
  *G06F 1/3234* (2019.01)
  *G06F 1/3287* (2019.01)
  *G06F 1/3203* (2019.01)

(52) U.S. Cl.
  CPC .......... *G06F 1/3234* (2013.01); *G06F 1/3203* (2013.01); *G06F 1/3287* (2013.01)

(58) Field of Classification Search
  CPC .................................................. G06F 1/3234
  USPC .......................................................... 713/320
  See application file for complete search history.

(56) References Cited

U.S. PATENT DOCUMENTS

| | | | | |
|---|---|---|---|---|
| 6,167,524 A * | 12/2000 | Goodnow | ............. | G06F 1/3203 713/300 |
| 6,651,176 B1 * | 11/2003 | Soltis, Jr. | ............. | G06F 1/3203 713/300 |
| 8,615,672 B2 | 12/2013 | Henry et al. | | |
| 8,843,772 B2 * | 9/2014 | Hormuth | ................... | G06F 1/28 713/300 |
| 8,856,566 B1 * | 10/2014 | Jane | .......................... | G06F 1/26 713/320 |
| 2003/0079150 A1 * | 4/2003 | Smith | .................... | G06F 1/3203 713/320 |
| 2006/0053323 A1 * | 3/2006 | Kissell | ..................... | G06F 21/75 713/300 |
| 2006/0288241 A1 * | 12/2006 | Felter | .................... | G06F 1/3203 713/300 |
| 2007/0198863 A1 * | 8/2007 | Bose | ........................ | G06F 1/206 713/300 |
| 2008/0002603 A1 * | 1/2008 | Hutsell | .................. | G06F 1/3203 370/318 |
| 2008/0263373 A1 * | 10/2008 | Meier | .................... | G06F 1/3203 713/300 |
| 2011/0022857 A1 * | 1/2011 | Nussbaum | ............ | G06F 1/3203 713/300 |
| 2012/0047385 A1 * | 2/2012 | Henry | .................... | G06F 1/3203 713/340 |
| 2012/0116599 A1 * | 5/2012 | Arndt | ......................... | G06F 1/26 700/291 |
| 2012/0143385 A1 * | 6/2012 | Goldsmith | ................ | H02J 3/38 700/297 |

(Continued)

*Primary Examiner* — Volvick Derose
(74) *Attorney, Agent, or Firm* — Meyertons, Hood, Kivlin, Kowert & Goetzel, P.C.; Erik A. Heter

(57) ABSTRACT

In some embodiments, a system includes a plurality of processor cores connected to an energy source. The system further includes one or more budget creation circuits configured to determine respective portions of a total credit budget of the energy source. The system further includes a plurality of credit distribution circuits configured to distribute the respective portions of the total credit budget to respective subsets of the processor cores. The credit distribution circuits share energy credits in response to determining that at least some energy credits will be unused. As a result, energy credits are more likely to be used by the processor cores, as compared to a system where the energy credits are not shared.

19 Claims, 7 Drawing Sheets

(56) References Cited

U.S. PATENT DOCUMENTS

| | | | |
|---|---|---|---|
| 2012/0203387 A1* | 8/2012 | Takayama | H01M 10/441 700/291 |
| 2012/0254633 A1* | 10/2012 | Vilhauer | G06F 1/3212 713/300 |
| 2013/0006831 A1* | 1/2013 | Mise | G06Q 10/06 705/37 |
| 2014/0052965 A1* | 2/2014 | Sarel | G06F 9/4893 712/214 |
| 2014/0068284 A1* | 3/2014 | Bhandaru | G06F 1/26 713/300 |
| 2014/0149760 A1* | 5/2014 | Drake | G06F 1/3234 713/320 |
| 2014/0181503 A1* | 6/2014 | Bettink | G06F 9/44 713/100 |
| 2014/0298047 A1* | 10/2014 | Holler | G06F 1/329 713/300 |
| 2015/0033045 A1* | 1/2015 | Raghuvanshi | G06F 1/3234 713/320 |
| 2015/0067356 A1* | 3/2015 | Trichy Ravi | G06F 1/324 713/300 |
| 2015/0089254 A1* | 3/2015 | Burns | G06F 1/3234 713/320 |
| 2017/0160781 A1* | 6/2017 | Piga | G06F 1/3203 |
| 2017/0256952 A1* | 9/2017 | Sugahara | H02J 3/383 |
| 2017/0277576 A1* | 9/2017 | Labasan | G06F 9/5083 |
| 2018/0082224 A1* | 3/2018 | Leslie | G06F 9/50 |

\* cited by examiner

PROCESSOR ENERGY MANAGEMENT SYSTEM

BACKGROUND

Technical Field

This disclosure relates generally to a processor energy management system.

Description of the Related Art

Many devices include multiple processor cores. Processor cores can be significant energy consumers, especially under certain workloads. Accordingly, there can be operating points (combinations of supply voltage magnitude and operating frequency) at which, if all the processor cores are actively executing, the device is at risk of exceeding a capacity of a power supply in the device. That is, the power supply is only capable of sourcing a certain amount of energy per unit time (e.g., a clock cycle). If one or more processor cores are actively executing energy consumption-intensive workloads at some operating points, the resulting aggregate energy consumption rate can, in some cases, exceed the capacity of the power supply. Exceeding the capacity of the power supply may cause erroneous operation (e.g., the supply voltage magnitude may drop to a point at which the device no longer operates properly at the operating frequency).

One way to limit the energy consumption rate of the device is to reduce the rate at which the workloads are executed, a process called throttling. One form of throttling involves preventing a processor core from executing a portion of a workload during a current clock cycle, instead inserting a stall instruction into a pipeline of the processor core.

SUMMARY

In various embodiments, a processor energy management system is disclosed that includes a plurality of processor cores, a plurality of credit distribution circuits, and at least one budget creation circuit. The at least one budget creation circuit indicates to the plurality of credit distribution circuits respective amounts of energy credits available for consumption by processor cores associated with the plurality of credit distribution circuits. However, a first credit distribution circuit may determine that at least some of the energy credits will be unused by processor cores corresponding to the first credit distribution circuit. The first credit distribution circuit may provide the unused energy credits to a second credit distribution circuit, where processor cores corresponding to the second credit distribution circuit may consume the unused energy credits. As a result, the processor cores corresponding to the second credit distribution circuit may have more than an assigned number of energy credits available and may perform additional pipeline operations, as compared to if the unused energy credits were not received. In some cases, a total credit budget for the system may be more fully used, as compared to a system where energy credits are not shared. Additionally, in some cases, a set of pipeline operations may be performed by the system more quickly without exceeding an energy capacity of an energy supply of the system, as compared to a system where energy credits are not shared.

Figure 1:
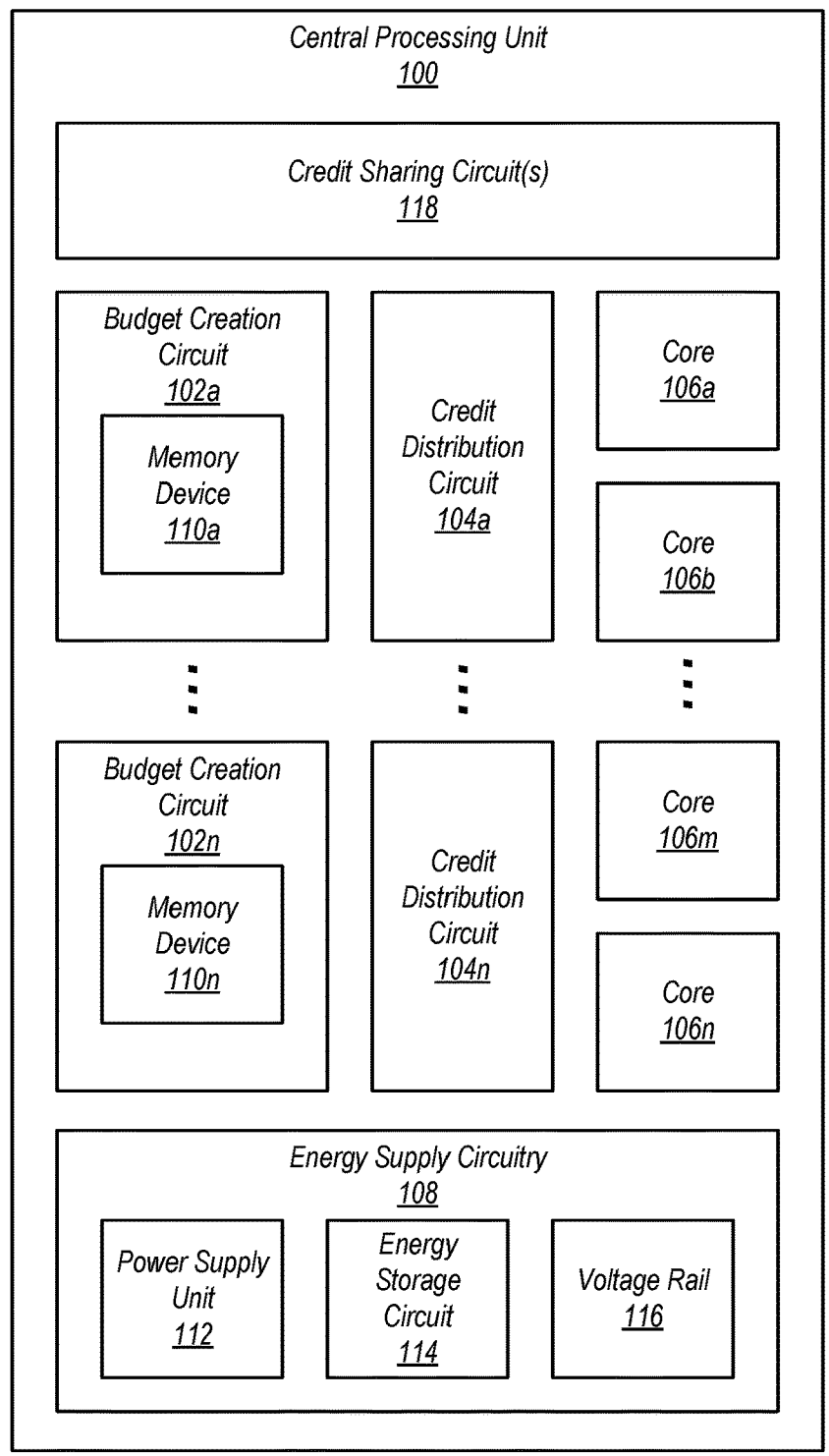
FIG. 1 is a block diagram illustrating one embodiment of a processor energy management system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this stricture is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a memory device that includes six processor cores, the terms "first processor core" and "second processor core" can be used to refer to any two of the six processor core, and not, for example, just logical processor cores 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A processor energy management system is disclosed that includes multiple energy consumption rate limiting systems (e.g., subsystems operating at different frequencies). The energy consumption rate limiting systems may regulate whether respective processor cores are authorized to perform one or more pipeline operations at a given point in time. Performing the one or more pipeline operations may include sending some set of values to pipelines of the processor cores, where the values are usable to process at least a portion of an instruction. When the one or more pipeline operations are not performed (e.g., delayed), an associated amount of energy is not consumed by the processor cores, and an associated rate of energy consumption of the system is therefore reduced.

In some embodiments, the processor cores are allocated respective quantities of energy credits, where the energy credits available to a processor core indicate an amount (e.g., a maximum amount) of energy the processor core is authorized to consume during a particular window of time (e.g., a clock cycle or a fixed number of clock cycles). In some cases, energy credits are allocated to the processor cores periodically. After the processor cores are allocated energy credits, the processor cores may consume the energy credits by performing pipeline operations (e.g., executing at least portions of instructions). The processor cores may delay performance of one or more pipeline operations based on a number of respective remaining energy credits (e.g., due to an insufficient number of remaining energy credits). In some cases, performance of the one or more pipeline operations may be resumed at a later time, such as when additional energy credits are allocated. As a result, the processor cores of an energy consumption rate limiting system may function without exceeding an allocated energy budget.

However, in systems where processor cores of multiple energy consumption rate limiting systems receive energy from a same power supply (e.g., a same power supply unit), pipeline operations may be delayed even though performance of those pipeline operations would not result in exceeding a total energy budget of the power supply. For example, a system may allocate respective portions of a total energy budget of the power supply to the energy consumption rate limiting systems. If processor cores of one energy consumption rate limiting system do not consume all of a respective allocated energy budget, then processor cores of another energy consumption rate limiting system may exceed a respective allocated energy budget without exceeding the total energy budget. As described further herein, the processor energy management system includes credit distribution circuits that may determine that a portion of an allocated energy budget will be unused. The credit distribution circuits may provide the unused energy credits to one or more other credit distribution circuits, enabling processor cores of the one or more other credit distribution circuits to exceed respective allocated energy budgets. As a result, the system may use more of the total energy budget, as compared to a system where credit distribution circuits do not share unused energy credits. Additionally, a set of pipeline operations may experience fewer delays and thus may be performed more quickly, as compared to a system where credit distribution circuits do not share unused energy credits.

As used herein, an "unused" energy credit refers to an energy credit that a credit distribution circuit predicts will not be consumed by a corresponding group of devices (e.g., processor cores or other devices) within a particular amount of time. Subsequent to being provided to another credit distribution circuit, the unused energy credits may be consumed by a different group of devices. Additionally, simply because the credit distribution circuit predicts that the energy credits will not be consumed does not mean that the corresponding group of devices cannot attempt to consume a sufficient amount of energy that at least some of the unused energy credits would have been consumed.

Although this disclosure is written in terms of energy consumption and energy consumption rate limiting, it is noted that similar systems could be created that operate based on other related units of measure (e.g., current and rate of charge depletion). Accordingly, when "energy" is used herein, other related units of measure are similarly considered.

For ease of description, the systems are described herein in terms of energy credits. However, in some embodiments, energy credits are not utilized. For example, instead of energy credits, a credit distribution circuit may provide indications of maximum amounts of switching capacitance per clock cycle to be used by respective processor cores during at least one clock cycle. Additionally, the credit distribution circuit may provide, to another credit distribution circuit, an indication of an amount of unused switching capacitance for a particular clock cycle. Alternatively, other methods of indicating authorization to consume energy may be used.

As used herein, certain components are described as "providing," "transferring," or "passing" energy credits. These terms refer to a process of sending, to various components, one or more indications of permission to use up to a particular amount of energy from an energy source. For example, these indications may be included in packetized data sent over a bus, where the receiving component is configured to interpret the data as specifying some particular number of energy credits to be transferred, etc. Alternately, these indications may be hard coded as specific physical signal lines. In some cases, these indications may be sent via one or more intervening components. In response to receiving the one or more indications, the components may schedule processes that are expected to consume amounts of energy that do not exceed an amount indicated by the energy credits.

This disclosure initially describes, with reference to FIG. 1, various portions of various embodiments of a processor energy management system that includes a plurality of instances of one embodiment of an energy consumption rate limiting system. Example processes performed by some embodiments of a processor energy management system are described with reference to FIGS. 2 and 3. Example processes performed by some embodiments of a credit sharing circuit of a processor energy management system are described with reference to FIG. 4. A method of sharing energy credits performed by an embodiment of a processor energy management system is described with reference to FIG. 5. The techniques and structures described herein, however, are in no way limited to the one or more processor energy management systems or energy consumption rate limiting systems described with reference to FIGS. 1-5; rather, this context is provided only as one or more possible implementations. An exemplary computing system that includes a processor energy management system is described with reference to FIG. 6. Finally, a process of fabricating a processor energy management system is described with reference to FIG. 7.

Turning now to FIG. 1, a block diagram of various embodiments of a central processing unit 100 configured to implement a processor energy management system is shown. In the illustrated embodiment, central processing unit 100 includes budget creation circuits 102a-n, credit distribution circuits 104a-n, cores 106a-n, energy supply circuitry 108, and credit sharing circuit(s) 118. Budget creation circuits 102a-n include respective memory devices 110a-n. Energy supply circuitry 108 includes power supply unit 112, energy storage circuit 114, and voltage rail 116. Although the variables a-n are used herein, in various embodiments, as described further below, different quantities of various circuits may be used. For example, central processing unit 100 may include two budget creation circuits 102, four credit distribution circuits 104, and eight cores 106. In some embodiments, one or more illustrated circuits may not be present. For example, as further discussed below, central processing unit 100 may not include credit sharing circuit(s) 118 (e.g., because credit distribution circuits 104a-n may communicate indications of unused energy credits directly) or may only include a single budget creation circuit 102.

Energy supply circuitry 108 includes one or more devices that provide, via voltage rail 116, energy to various portions of the system, including, in some embodiments, budget creation circuits 102a-n, credit distribution circuits 104a-n, cores 106a-n, and credit sharing circuit(s) 118. Accordingly, energy supply circuitry 108 includes power supply unit 112, which regulates voltage for central processing unit 100. Energy supply circuitry 108 may provide energy to central processing unit 100 at a particular maximum rate (e.g., may provide a particular amount of power), which may be configurable. However, in the illustrated embodiment, under certain workloads portions of central processing unit 100 (e.g., cores 106a-n) may exceed respective power allocations, thus causing energy demands of central processing unit 100 to exceed the particular maximum rate. Energy storage circuit 114 may store energy and may provide, via voltage rail 116, the stored energy to various portions of central processing unit 100 (e.g., cores 106a-n) when the energy demands of central processing unit 100 exceed the particular maximum rate. Energy storage circuit 114 may store excess energy produced by power supply unit 112 if energy demands of central processing unit 100 do not exceed a current output of power supply unit 112. In some embodiments, energy storage circuit 114 is formed by a plurality of decoupling capacitors.

Accordingly, within a specific window of time, a certain maximum amount of energy from energy supply circuitry 108 may be available for use at various portions of central processing unit 100. The various portions of central processing unit 100 may use corresponding portions of the energy as needed during the window of time (e.g., immediately or gradually over the window of time). This maximum amount of time may be used to generate a total budget. In particular, the total budget may be calculated based on at least one of: a current power state (e.g., a current energy consumption), a desired maximum aggregate energy consumption rate of cores 106a-n, or a leakage estimate of cores 106a-n.

To illustrate, power supply unit 112 may periodically produce 5000 watt-hours to be used by central processing unit 100 in periodic time windows of one hour each, and energy storage circuit 114 may store an additional 5000 watt-hours (some or all of which may be consumed by circuits of central processing unit 100 in a single time window or over multiple time windows). Of the 10,000 watt-hours available during a particular time window, 8000 watt-hours may be allocated to cores 106a-n. In some embodiments, the 8000 watt-hours may be represented by 80 energy credits (e.g., one energy credit represents 100 watt-hours). The 8000 watt-hours may be distributed evenly between cores 106a-n (e.g., 2000 watt-hours each) or unevenly between cores 106a-n (e.g., cores 106a and 106b are allocated 3000 watt-hours and cores 106m and 106n are allocated 1000 watt-hours). Different cores may consume some or all of the allocated energy differently. For example, if cores 106a-n receive 2000 watt-hours each, core 106a may consume 1900 watt-hours during a first 5 minutes of the hour and may consume the remaining 100 watt-hours by performing a stall process during the remaining 55 minutes of the hour. However, core 106b may consume 30 watt-hours per minute (e.g., 1800 watt-hours total) during the hour. Some cores may not consume all of the allocated energy during the particular time window. Accordingly, at least some energy may remain at energy storage circuit 114 at the end of the particular time window and may be available for use in subsequent time windows (e.g., in addition to additional energy produced by power supply unit 112).

In the illustrated embodiment, energy supply circuitry 108 only includes a single power supply unit (power supply unit 112), a single energy storage circuit (energy storage circuit 114), and a single voltage rail 116. However, in other embodiments, energy supply circuitry 108 may include multiple instances of at least one of power supply unit 112, energy storage circuit 114, or voltage rail 116. In some cases, at least some of the multiple instances may have different physical properties. In some embodiments, as further discussed below with reference to FIG. 2, voltage rail 116 may be configured to provide energy from multiple power supply units. Additionally, voltage rail 116 may include a rail separation circuit configured to separate an energy supply of at least some cores (e.g., cores 106a and 106b) from an energy supply of at least some other cores (e.g., cores 106m and 106n).

Budget creation circuits 102a-n may determine, based on respective allocated budgets of a total budget, an energy budget for respective cores of cores 106a-n for a time window. For example, memory devices 110a-n may include lookup tables including one or more predetermined credit budget indicators that indicate the energy budget based on a current energy consumption state of central processing unit 100, a desired energy consumption state of central processing unit 100, or both. The respective allocated budgets of the total budget may be non-overlapping (i.e., energy included in a first allocated budget may not additionally be included in a second allocated budget). In some embodiments, a first respective allocated budget of a first budget creation circuit (e.g., budget creation circuit 102a) may be larger than a second respective allocated budget of a second budget creation circuit (e.g., budget creation circuit 102n). The respective allocated budgets may be specified by one or more software or hardware components. The one or more software or hardware components may be included in central processing unit 100 or may be external to central processing unit 100. For example, in some embodiments, the respective allocated budgets may be user specified via an external software program. Budget creation circuits 102a-n may indicate the energy budgets to corresponding credit distribution circuits of credit distribution circuits 104a-n. In some embodiments, budget creation circuits 102a-n may estimate an amount of leakage associated with the current or desired energy consumption state of the central processing unit, and budget creation circuits 102a-n may reduce the respective allocated budgets using the estimated amount of leakage.

In various embodiments, budget creation circuits 102a-n may convert the respective allocated budgets into units of switching capacitance and may indicate the energy budgets using one or more switching capacitance values. As discussed further below, when an energy budget is indicated using units of switching capacitance, cores 106a-n may track energy usage more efficiently, as compared to a system where the energy budget is indicated using units of energy (e.g., joules) or units of charge. In a particular embodiment, budget creation circuits 102a-n may indicate the energy budgets to credit distribution circuits 104a-n by indicating credit budgets (e.g., maximum numbers of energy credits) to be allocated during one or more time windows. The energy credits may be in units of switching capacitance or in other units (e.g., joules).

As discussed further below, credit distribution circuits 104a-n (e.g., energy permission circuits) may receive requests for additional energy for corresponding cores 106a-n (e.g., from cores 106a-n or from one or more other circuits) and may provide, to the corresponding cores 106a-n, respective indications of permission to use additional energy based on the respective energy budgets. In some embodiments, the indications specify or otherwise indicate a number of energy credits allocated to the respective cores 106a-n, where the energy credits are indicative of the amount of additional energy the respective cores 106a-n are authorized to consume. The indications may be sent in accordance with an allocation scheme at credit distribution circuits 104a-n (e.g., a round robin allocation scheme, a priority-based allocation scheme, or another allocation scheme). Accordingly, credit distribution circuits 104a-n may control energy consumption of cores 106a-n. As a result, in some cases, some cores (e.g., core 106a) may be authorized to consume more energy than other cores (e.g., core 106b). Thus, credit distribution circuits 104a-n may provide flexibility regarding energy consumption of cores 106a-n.

In some cases, some credit distribution circuits (e.g., credit distribution circuit 104a) may determine that at least some energy credits available to be distributed to corresponding cores (e.g., cores 106a and 106b) will be unused. For example, credit distribution circuits may determine whether energy credits will be unused based on at least one of a number of energy credits received within a particular window of time, a number of requests received within a particular window of time, a request history, an instruction queue corresponding to the cores, or another factor. In response to determining that at least some energy credits (e.g., at least one credit or more energy credits than a specified threshold amount) will be unused by corresponding cores, credit distribution circuits 104a-n may provide the at least some energy credits to one or more other credit distribution circuits. In the illustrated embodiment, the energy credits are provided via credit sharing circuit(s) 118. In other embodiments, the energy credits may be provided directly or via one or more other circuits (e.g., one or more of budget creation circuits 102a-n).

As described further below with reference to FIGS. 2-4, credit sharing circuit(s) 118 may communicate information indicating a transfer of energy credits between one or more of credit distribution circuits 104a-n. In particular, credit sharing circuits(s) 118 may receive an indication of unused energy credits from a first credit distribution circuit and may provide an indication of additional energy credits (the unused energy credits) to a second credit distribution circuit. In some embodiments, central processing unit 100 includes a single credit sharing circuit 118 for each pair of credit distribution circuits. In other embodiments, at least some credit sharing circuits correspond to multiple credit distribution circuits. In some embodiments, some pairs of credit distribution circuits may not be connected by a credit sharing circuit 118.

Cores 106a-n may receive instructions indicative of one or more respective pipeline operations to be performed. Cores 106a-n may also track a respective amount of energy (e.g., a respective number of energy credits) allocated to cores 106a-n, up to respective maximum amounts of energy. In some embodiments, the respective maximum amounts of energy may be based on an amount of energy that can be stored at energy storage circuit 114 (e.g., an amount of energy sufficient to support all cores 106a-n consuming respective allocated energy during a same time window). Based on the respective amounts of energy, cores 106a-n may selectively determine whether to delay performance of the one or more respective pipeline operations. Cores 106a-n may be more likely to delay performance of one or more respective pipeline operations based at least in part on respective amounts of allocated energy. In some embodiments, a total amount of allocated energy to cores 106a-n may correspond to an amount of energy stored by energy storage circuit 114. As discussed further below, cores 106a-n may delay performance of the one or more respective pipeline operations by executing at least a portion of a stall instruction. Executing at least the portion of the stall instruction may consume less energy than performing the one or more respective pipeline operations. In some embodiments, cores 106a-n may be configured to share energy credits with other cores that correspond to a same credit distribution circuit. For example, in response to core 106a having fewer energy credits than a request threshold, core 106a may indicate to one or more other cores of cores 106a-n that core 106a has fewer energy credits than the request threshold. In response to the indication from core 106a, core 106b may determine that core 106b has more energy credits than a sharing threshold and provide one or more energy credits to core 106a.

In some embodiments, some or all of cores 106a-n may be designed differently such that some of cores 106a-n may perform some pipeline operations more quickly or by consuming less energy. For example, as further described below with reference to FIG. 3, cores 106a and 106b may be designed to process pipeline operations at a higher frequency, as compared to cores 106m and 106n. As another example, cores 106m and 106n may be designed to consume less energy at a particular frequency, as compared to cores 106a and 106b. Accordingly, cores 106a and 106b may have design characteristics corresponding to a first frequency and cores 106m and 106n may have design characteristics corresponding to a second frequency. In other embodiments, cores 106a-n may share a single design.

In response to a change in the respective allocated energy budget, credit distribution circuits 104a-n may be used to adjust energy consumption of the cores 106a-n within particular windows of time. For example, credit distribution circuit 104a may provide additional energy credits for a particular window of time to cores 106a and 106b in response to one or more requests for additional energy credits. As another example, credit distribution circuit 104a may not provide additional energy credits or may provide fewer than a requested number of energy credits to cores 106a and 106b for the particular window of time in response to the requests for additional energy credits. For example, in response to a request from core 106a for 5 additional energy credits, credit distribution circuit 104 may provide 3 energy credits or no energy credits. As a result, cores 106a and 106b may delay one or more pipeline operations, reducing the rate of energy consumption of central processing unit 100.

In some embodiments, instead of providing energy credits to cores 106a-n, credit distribution circuits 104a-n may specify to cores 106a-n respective assigned maximum rates of consumption of energy credits. In some embodiments, cores 106a-n may stall one or more pipeline operations in response to determining that the assigned maximum rates may be exceeded by performing the one or more pipeline operations at a particular time (e.g., during a current clock cycle). In some cases, specifying rates of consumption of energy credits may result in fewer communications between credit distribution circuits 104a-n and cores 106a-n, as compared to specifying allocated energy credits.

Figure 2:
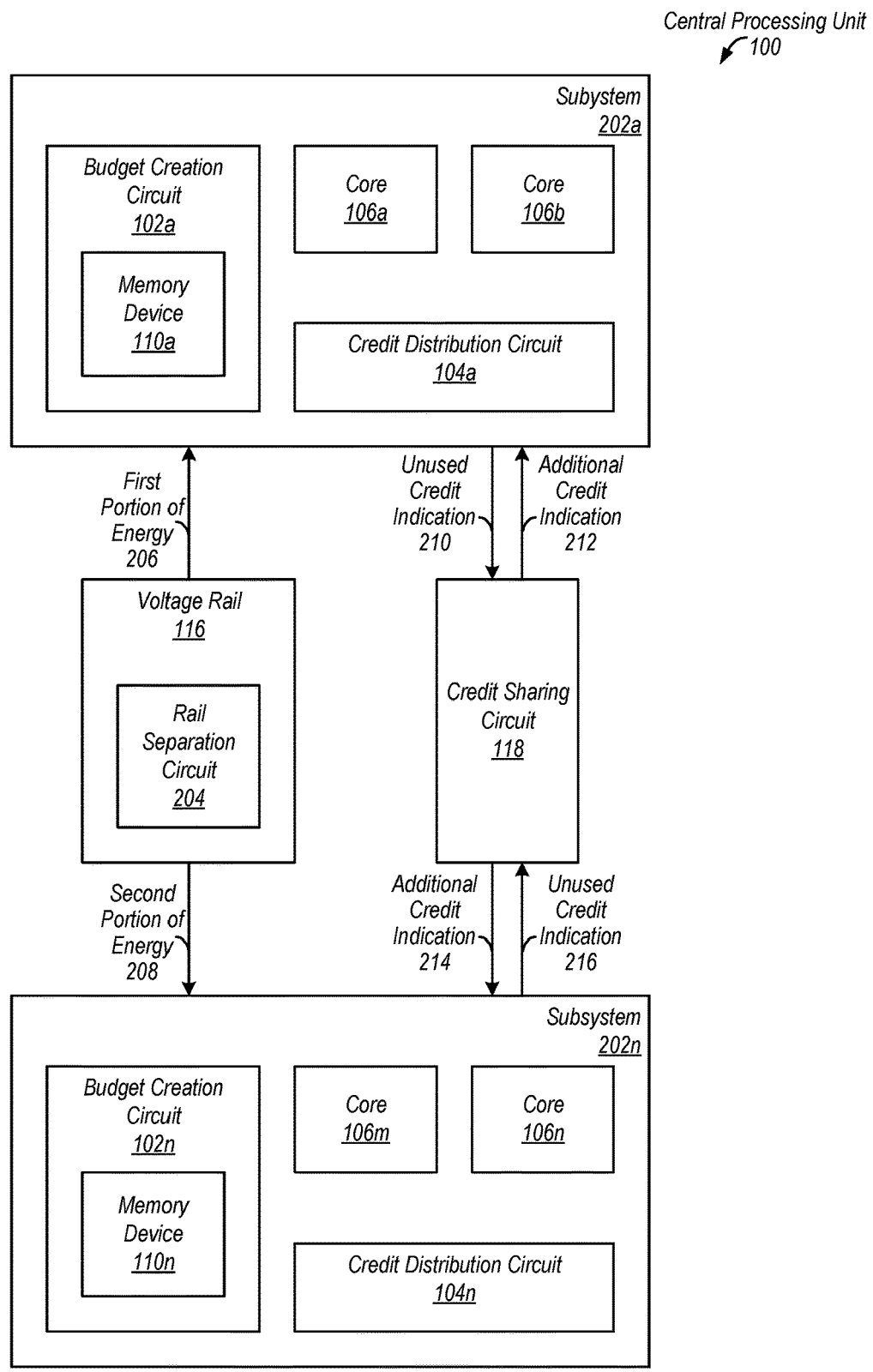
FIG. 2 is a block diagram illustrating interactions between various portions of one embodiment of a processor energy management system.

Turning now to FIG. 2, a block diagram illustrating interactions between various portions of one embodiment of central processing unit 100 is shown. In the illustrated embodiment, central processing unit 100 includes subsystems 202a-n. Additionally, voltage rail 116 includes rail separation circuit 204. In the illustrated embodiment, subsystems 202a-n are shown for ease of illustration and do not correspond to physically separate hardware. However, in other embodiments, subsystems 202a-n may correspond to physically separate integrated circuits.

As described above, budget creation circuits 102a-n store indications of corresponding allocated amounts of a total energy budget in memory devices 110a-n. In the illustrated embodiment, the allocated energy budgets correspond to first portion of energy 206 and second portion of energy 208. Budget creation circuits 102a-n may divide corresponding portions of energy between devices of corresponding subsystems 202a-n. For example, budget creation circuit 102a may determine an amount of first portion of energy 206 to allocate to cores 106a and 106b. Additionally, in some embodiments, budget creation circuit 102a may further allocate portions of first portion of energy to one or more other devices (e.g., credit distribution circuit 104a). In some embodiments, some devices of subsystems 202a-n may receive energy from another source, via one or more other connections, or both.

As described above, credit sharing circuit 118 may be used by credit distribution circuits 104a and 104n to share unused energy credits. In the illustrated embodiment, in response to determining that at least some energy credits available to be distributed to cores 106a and 106b will be unused, credit distribution circuit 104a may send unused credit indication 210 to credit sharing circuit 118. Unused credit indication 210 may indicate an amount of energy credits to be shared. Credit sharing circuit 118 may send the amount of energy credits to be shared to credit distribution circuit 104n as additional credit indication 214. Similarly, credit distribution circuit 104n may send unused credit indication 216 to credit sharing circuit 118 and credit sharing circuit 118 may send additional credit indication 212 to credit distribution circuit 104a. Accordingly, subsystem 202a may share energy credits with subsystem 202n. In other embodiments, subsystems 202a and 202n may share energy credits via another route. For example, credit distribution circuit 104n may send unused credit indication 216 to at least one of budget creation circuit 102n, budget creation circuit 102a, or credit distribution circuit 104a.

In some embodiments, unused credit indications 210 and 216 may indicate all energy credits that are expected to be unused by respective subsystems 202a and 202n. In other embodiments, subsystems 202a and 202n may share up to a particular amount (e.g., a fixed amount or percentage) of unused energy credits. Alternatively, subsystems 202a and 202n may retain (refrain from sharing) a particular amount of unused energy credits. As described further below with reference to FIG. 4, in some embodiments, additional credit indications 212 and 214 may be sent in response to a periodic check by subsystems 202a and 202n, respectively, for unused energy credits.

Rail separation circuit 204 may disconnect voltage rail 116 such that subsystem 202a is separated from subsystem 202n. For example, voltage rail 116 may be disconnected via one or more switches or via one or more fuses. Other disconnection mechanisms may also be used. Accordingly, subsystems 202*a-n* may be configured to perform operations using either separate energy supply circuitry or a same energy supply circuitry. Subsystems 202*a-n* may manage corresponding allocated energy budgets without considering energy budgets of other subsystems. However, when subsystems 202*a-n* are connected to a same energy supply, subsystems 202*a-n* may share energy credits as described herein. This design may, in some cases, provide designers additional flexibility regarding designing integrated circuits that include subsystems 202*a-n*.

Figure 3:
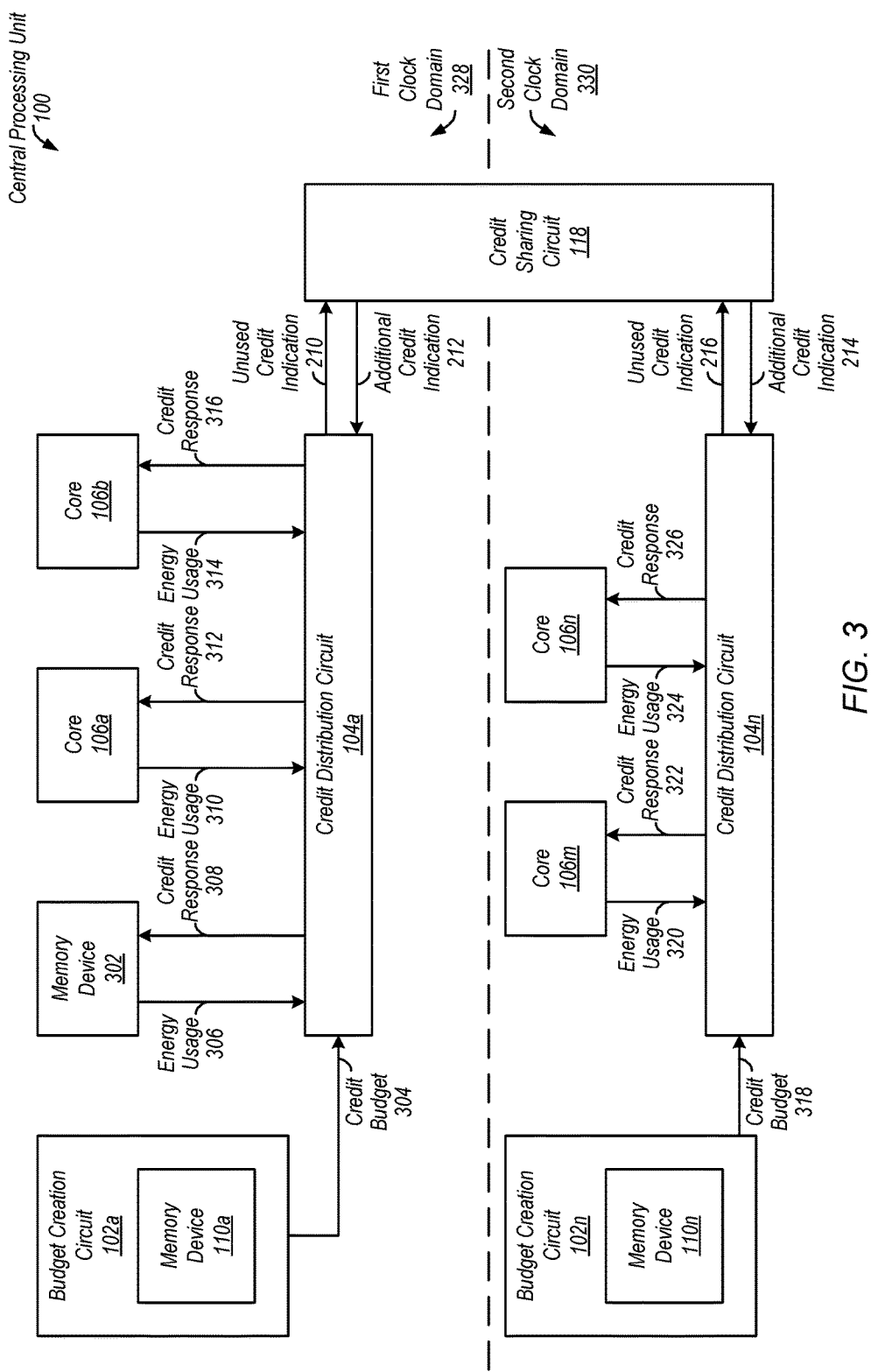
FIG. 3 is a block diagram illustrating an energy credit distribution process performed by one embodiment of a processor energy management system.

Turning now to FIG. 3, a block diagram illustrating an energy credit distribution process performed by one embodiment of central processing unit 100 is shown. In the illustrated embodiment, central processing unit 100 additionally includes memory device 302. Similar to cores 106*a-n*, memory device 302 may consume energy credits to perform operations. In some embodiments, other devices may also consume energy credits. Further, central processing unit 100 is divided into first clock domain 328 and second clock domain 330.

As described above, budget creation circuit 102*a* indicates credit budget 304 to credit distribution circuit 104*a*. Credit budget 304 may be calculated based on a current power state, a desired maximum aggregate energy consumption rate of corresponding devices (e.g., memory device 302 and cores 106*a* and 106*b*), or a leakage estimate of the corresponding devices. Credit budget 318 may be indicated to credit distribution circuit 104*n* and may be calculated in a similar manner.

Credit distribution circuit 104*a* may include a credit tracker (not shown) that receives indications of energy usage 306, 310, and 314 from memory device 302 and cores 106*a* and 106*b*. The credit tracker may track a number of remaining energy credits at memory device 302 and cores 106*a* and 106*b*, respectively, and may request additional energy credits from another portion of credit distribution circuit 104*a* based on the amount of remaining energy credits. Credit distribution circuit 104*a* may, in response to a request for additional energy credits, send credit responses 308, 312, and 316 to memory device 302 and cores 106*a* and 106*b*, respectively, indicating additional allocated energy credits. Credit distribution circuit 104*n* may operate in a similar manner using energy usage 320 and 324 and credit responses 322 and 326 with regard to cores 106*m* and 106*n*. Accordingly, credit distribution circuits 104*a* and 104*n* may allocate credit budgets 304 and 318 to corresponding devices.

Cores 106*a-n* and memory device 302 may additionally internally track respective amounts of allocated energy credits. Based on the number of remaining energy credits, cores 106*a-n* and memory device 302 may determine whether to perform operations (e.g., pipeline operations or memory operations). In response to determining to perform an operation, cores 106*a-n* and memory device 302 may deduct a corresponding amount of energy credits from the amount of allocated energy credits and indicate, via energy usage 306, 310, 314, 320, and 324, respectively, to the corresponding credit distribution circuit the amount of energy usage.

As described above with reference to FIG. 2, credit distribution circuits 104*a* and 104*n* may share unused energy credits by communicating with credit sharing circuit 118. Additionally, in some embodiments, credit distribution circuits 104*a* and 104*n* may prevent received shared energy credits from being sent back. For example, credit distribution circuit 104*a* may determine whether to share energy credits based on credit budget 304. Subsequent to determining whether to share energy credits, credit distribution circuit 104*a* may add the energy credits of additional credit indication 212 to any remaining energy credits. In other embodiments, the energy credits of additional credit indication 212 may be considered when determining whether to share energy credits. In some embodiments, credit distribution circuit 104*a* may share energy credits without sending an indication of the unused energy credits to budget creation circuit 102*a*.

In the illustrated embodiment, budget creation circuit 102*a*, credit distribution circuit 104*a*, cores 106*a* and 106*b*, and memory device 302 are in first clock domain 328. Accordingly, budget creation circuit 102*a*, credit distribution circuit 104*a*, cores 106*a* and 106*b*, and memory device 302 may operate at a first frequency (e.g., 1 Mhz). In the illustrated embodiment, budget creation circuit 102*n*, credit distribution circuit 104*n*, and cores 106*m* and 106*n* are in second clock domain 330. Accordingly, budget creation circuit 102*a*, credit distribution circuit 104*a*, cores 106*a* and 106*b*, and memory device 302 may operate at a second frequency (e.g., 3 Mhz). As described further below with reference to FIG. 4, credit sharing circuit 118 may cross the clock domain crossing between first clock domain 328 and second clock domain 330. As a result, by communicating with credit sharing circuit 118, credit distribution circuits 104*a* and 104*n* may share unused energy credits despite running at different frequencies.

Figure 4:
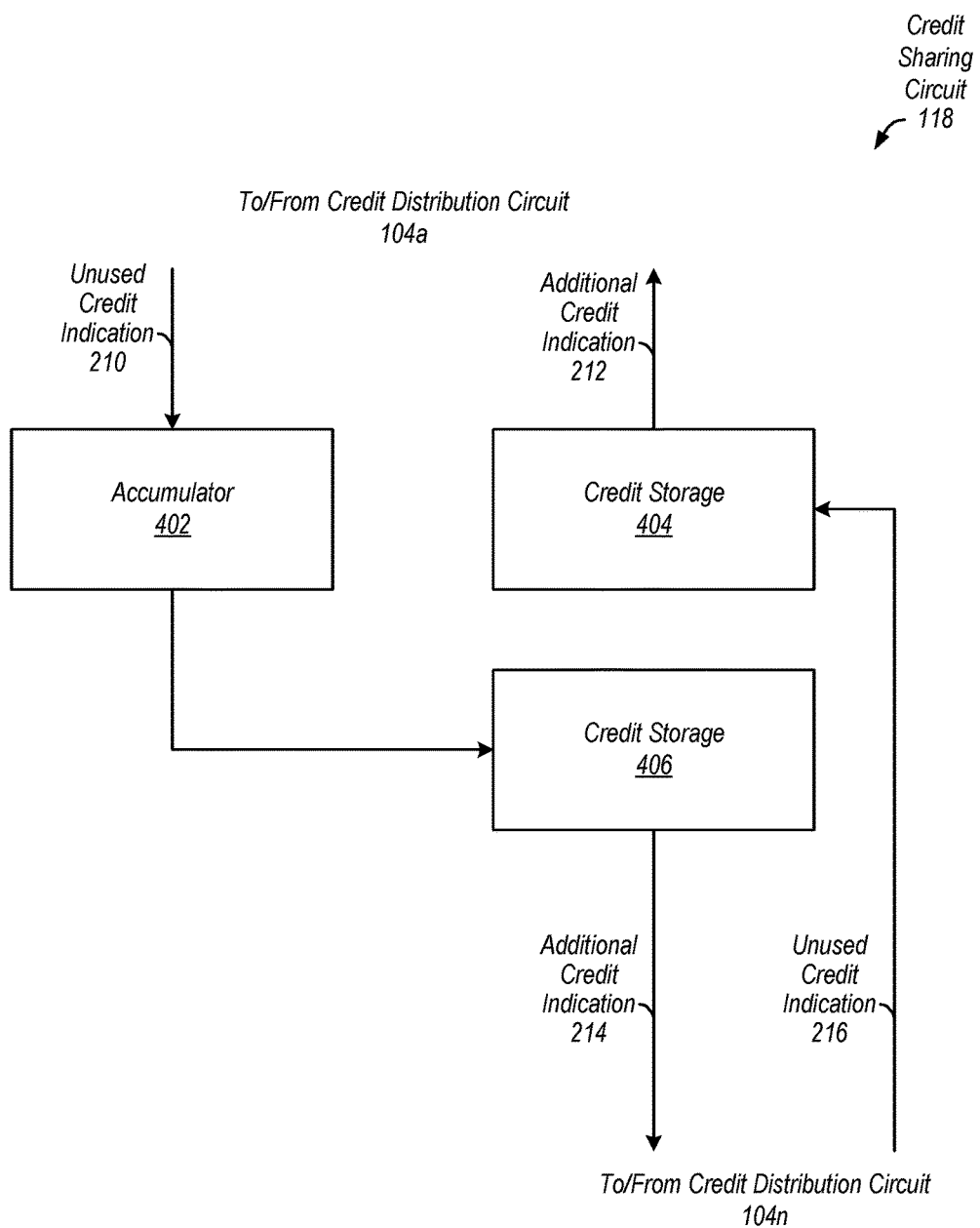
FIG. 4 is a block diagram illustrating a credit sharing circuit of one embodiment of a processor energy management system.

Turning now to FIG. 4, a block diagram illustrating functions performed by one embodiment of credit sharing circuit 118 is shown. In the illustrated embodiment, credit sharing circuit includes accumulator 402, credit storage 404, and credit storage 406. In other embodiments, various devices may not be included. For example, accumulator 402 may not be included. Alternatively, one or more additional devices may be included, such as a second accumulator that receives unused credit indication 216. Additionally, credit storages 404 and 406 may be a single device.

As described above with reference to FIG. 2, credit distribution circuit 104*n* may send unused credit indication 216 to credit sharing circuit 118. Unused credit indication 216 may indicate a number of unused energy credits available for consumption by devices associated with credit distribution circuit 104*a*. Credit sharing circuit 118 may store unused credit indication 216 in credit storage 404. Further, credit sharing circuit 118 may send additional credit indication 212 to credit distribution circuit 104*a*, indicating the number of available unused energy credits. In some embodiments, credit storage 404 may be a first-in first-out (FIFO) queue. In other embodiments, credit storage 404 may be a shared memory location or another device that stores an indication of unused energy credits.

Energy credits may be sent from credit distribution circuit 104*a* to credit distribution circuit 104*n* in a similar manner. However, in the embodiment illustrated in FIG. 3, credit distribution circuit 104*a* is in a different clock domain than credit distribution circuit 104*n*. In the illustrated embodiment, credit distribution circuit 104*a* runs at a higher frequency than credit distribution circuit 104*n*. Further, additional credit indications 212 and 214 may be sent in response to a request from corresponding credit distribution circuits 104*a* and 104*n*. Accordingly, unused credit indication 210 may be received at a faster rate than additional credit indication 214 may be sent. Accumulator 402 may aggregate multiple unused credit indications 210 so less storage space is used by credit storage 406. Subsequently, credit sharing circuit 118 may send additional credit indication 214 to credit distribution circuit 104*n*, indicating the number of available unused energy credits. Accordingly, energy credits may be shared across a clock domain. In some embodiments, credit storage 406 may be a first-in first-out (FIFO) queue. In other embodiments, credit storage 406 may be a shared memory location or another device that stores an indication of unused energy credits.

In other embodiments, no accumulator may be used. For example, credit storage 406 may have a larger amount of storage space than credit storage 404. Additionally, in other embodiments, rather than sending additional credit indications 212 and 214 in response to requests, credit sharing circuit 118 may periodically broadcast additional credit indications 212 and 214.

Figure 5:
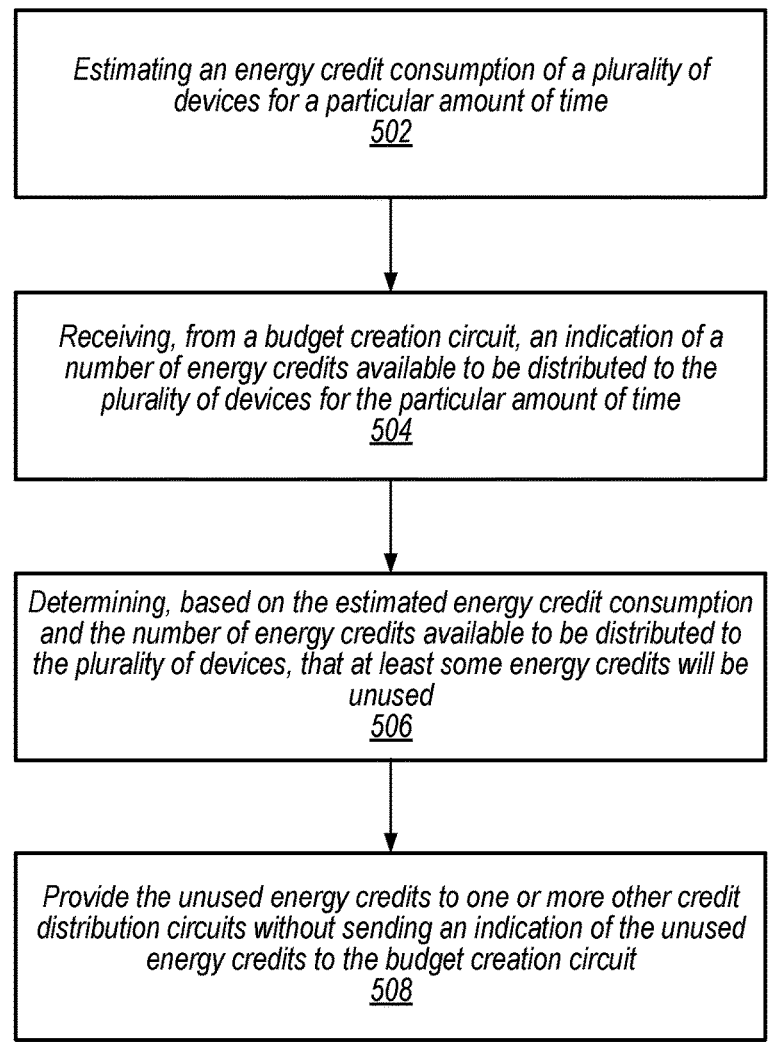
FIG. 5 is a flow diagram illustrating one embodiment of a method of sharing energy credits.

Referring now to FIG. 5, a flow diagram of a method 500 is depicted. Method 500 is an embodiment of a method of sharing energy credits. In some embodiments, method 500 may be initiated or performed by one or more processors in response to one or more instructions stored by a computer-readable storage medium.

At 502, method 500 includes estimating an energy credit consumption of a plurality of devices for a particular amount of time. For example, credit distribution circuit 104a of FIG. 3 may estimate an energy credit consumption of memory device 302 and cores 106a and 106b for a particular amount of time (e.g., one clock cycle or one hundred clock cycles). In some embodiments, the energy credit consumption of the plurality of devices may be estimated based on requests for additional energy credits received from the plurality of devices, indications of actions to be performed by the plurality of devices, indications of actions performed by the plurality of devices within a particular period of time, or other factors.

At 504, method 500 includes receiving, from a budget creation circuit, an indication of a number of energy credits available to be distributed to the plurality of devices for the particular amount of time. For example, credit distribution circuit 104a may receive credit budget 304.

At 506, method 500 includes determining, based on the estimated energy credit consumption and the number of energy credits available to be distributed to the plurality of devices, that at least some energy credits will be unused. For example, credit distribution circuit 104a may determine that the estimated energy credit consumption is smaller than credit budget 304.

At 508, method 500 includes providing the unused energy credits to one or more other credit distribution circuits without sending an indication of the unused energy credits to the budget creation circuit. For example, credit distribution circuit 104a may send an indication of the unused energy credits to credit distribution circuit 104n without sending an indication to budget creation circuit 102a. Accordingly, a method of sharing energy credits is depicted.

Figure 6:
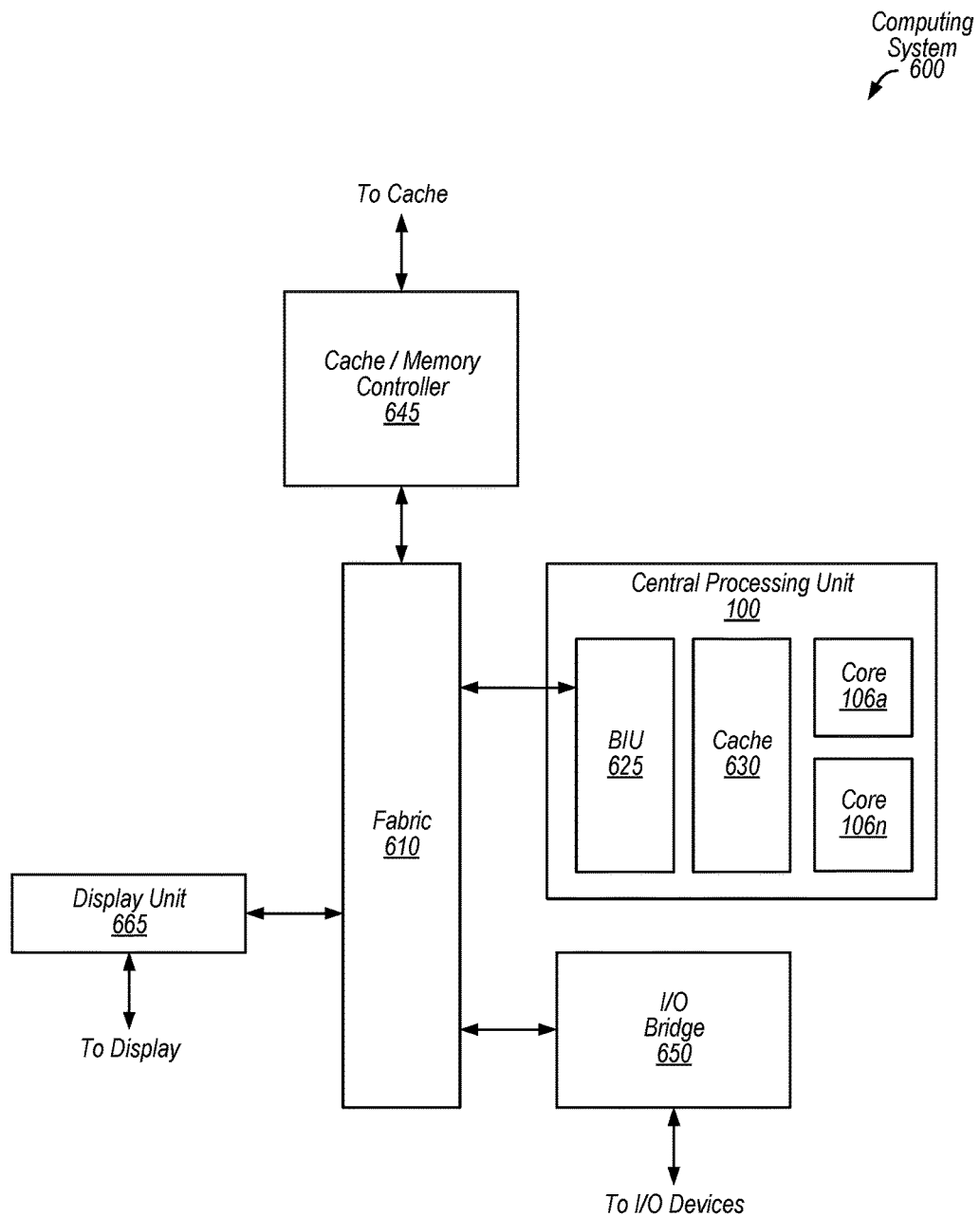
FIG. 6 is block diagram illustrating an embodiment of a computing system that includes at least a portion of a processor energy management system.

Turning next to FIG. 6, a block diagram illustrating an exemplary embodiment of a computing system 600 that includes at least a portion of an exemplary processor energy management system. The computing system 600 includes central processing unit 100 of FIG. 1. In some embodiments, central processing unit 100 includes one or more of the circuits described above with reference to FIGS. 1-5, including any variations or modifications described previously with reference to FIGS. 1-5. In some embodiments, some or all elements of the computing system 600 may be included within a system on a chip (SoC). In some embodiments, computing system 600 is included in a mobile device. Accordingly, in at least some embodiments, area and power consumption of the computing system 600 may be important design considerations. In the illustrated embodiment, the computing system 600 includes fabric 610, central processing unit (CPU) 100, input/output (I/O) bridge 650, cache/memory controller 645, and display unit 665. Although the computing system 600 illustrates central processing unit 100 as being connected to fabric 610 as a sole central processing unit of the computing system 600, in other embodiments, central processing unit 100 may be connected to or included in other components of the computing system 600 and other central processing units may be present. Additionally or alternatively, the computing system 600 may include multiple central processing units 100. The multiple central processing units 100 may correspond to different embodiments or to the same embodiment.

Fabric 610 may include various interconnects, buses, MUXes, controllers, etc., and may be configured to facilitate communication between various elements of computing system 600. In some embodiments, portions of fabric 610 are configured to implement various different communication protocols. In other embodiments, fabric 610 implements a single communication protocol and elements coupled to fabric 610 may convert from the single communication protocol to other communication protocols internally.

In the illustrated embodiment, central processing unit 100 includes bus interface unit (BIU) 625, cache 630, and cores 106a and 106n. In various embodiments, central processing unit 100 includes various numbers of cores and/or caches. For example, central processing unit 100 may include 1, 2, or 4 processor cores, or any other suitable number. In some embodiments, cores 106a and/or 106n include internal instruction and/or data caches. In some embodiments, a coherency unit (not shown) in fabric 610, cache 630, or elsewhere in computing system 600 is configured to maintain coherency between various caches of computing system 600. BIU 625 may be configured to manage communication between central processing unit 100 and other elements of computing system 600. Processor cores such as cores 106a and 106n may be configured to execute instructions of a particular instruction set architecture (ISA), which may include operating system instructions and user application instructions. In some embodiments, central processing unit 100 is configured to manage energy consumption at cores 106a and 106n.

Cache/memory controller 645 may be configured to manage transfer of data between fabric 610 and one or more caches and/or memories (e.g., non-transitory computer readable mediums). For example, cache/memory controller 645 may be coupled to an L3 cache, which may, in turn, be coupled to a system memory. In other embodiments, cache/memory controller 645 is directly coupled to a memory. In some embodiments, the cache/memory controller 645 includes one or more internal caches. In some embodiments, the cache/memory controller 645 may include or be coupled to one or more caches and/or memories that include instructions that, when executed by one or more processors (e.g., central processing unit 100 and/or one or more cores 106a, 106n), cause the processor, processors, or cores to initiate or perform some or all of the processes described above with reference to FIGS. 1-5 or below with reference to FIG. 7.

As used herein, the term "coupled to" may indicate one or more connections between elements, and a coupling may include intervening elements. For example, in FIG. 6, display unit 665 may be described as "coupled to" central processing unit 100 through fabric 610. In contrast, in the illustrated embodiment of FIG. 6, display unit 665 is "directly coupled" to fabric 610 because there are no intervening elements.

Display unit 665 may be configured to read data from a frame buffer and provide a stream of pixel values for display.

Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 600 via I/O bridge 650. In some embodiments, central processing unit 100 may be coupled to computing system 600 via I/O bridge 650.

Figure 7:
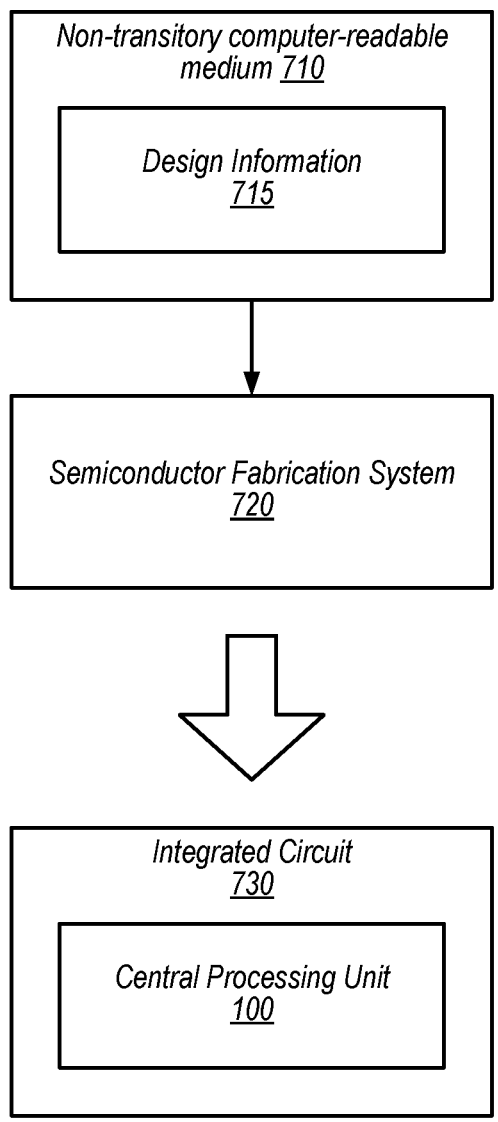
FIG. 7 is a block diagram illustrating one embodiment of a process of fabricating a processor energy management system.

FIG. 7 is a block diagram illustrating a process of fabricating a processor energy management system. FIG. 7 includes a non-transitory computer-readable medium 710 and a semiconductor fabrication system 720. Non-transitory computer-readable medium 710 includes design information 715. FIG. 7 also illustrates a resulting fabricated integrated circuit 730. Integrated circuit 730 includes central processing unit 100 of FIG. 1. In the illustrated embodiment, semiconductor fabrication system 720 is configured to process design information 715 stored on non-transitory computer-readable medium 710 and fabricate integrated circuit 730.

Non-transitory computer-readable medium 710 may include any of various appropriate types of memory devices or storage devices. For example, non-transitory computer-readable medium 710 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 710 may include two or more memory mediums, which may reside in different locations (e.g., in different computer systems that are connected over a network).

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries, which specify the synthesis and/or layout of integrated circuit 730. In some embodiments, the design information is specified in whole or in part in the form of a netlist that specifies cell library elements and their connectivity.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements described with reference to FIGS. 1-6. Further, integrated circuit 730 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of processor cores connected to an energy source, wherein the plurality of processor cores are configured to regulate energy consumption using energy credits, wherein the plurality of processor cores are connected to the at least one energy source via a voltage rail;
   a rail separation circuit configured to separate the energy source from at least one of the first and second subsets of the plurality of processor cores;
   a first budget creation circuit configured to determine a first portion of energy credits of a total credit budget of the energy source;
   a first credit distribution circuit configured to distribute the first portion of energy credits to the first subset of the plurality of processor cores; and
   a second budget creation circuit configured to determine a second portion of energy credits of the total credit budget, wherein the second portion of energy credits does not include the first portion of energy credits, and wherein the second budget creation circuit is separate from the first budget creation circuit;

a second credit distribution circuit configured to distribute the second portion of energy credits to the second subset of the plurality of processor cores;

wherein the first credit distribution circuit is configured, in response to determining that at least some energy credits available to be distributed to the first subset of the plurality of processor cores will be unused, to provide the at least some energy credits to the second credit distribution circuit without sending an indication of the unused energy credits to the first budget creation circuit or to the second budget creation circuit; and wherein the second credit distribution circuit is configured, in response to determining that at least some energy credits available to be distributed to the second subset of the plurality of processor cores will be unused, to provide the at least some energy credits to the first credit distribution circuit without sending an indication of the unused energy credits to the first budget creation circuit or to the second budget creation circuit.

2. The system of claim 1, further comprising a credit sharing circuit configured to communicate information between the first credit distribution circuit and the second credit distribution circuit, wherein the information indicates that energy credits are being transferred between the first credit distribution circuit and the second credit distribution circuit, and wherein the credit sharing circuit is separate from the first budget creation circuit and from the second budget creation circuit.

3. The system of claim 2, wherein the credit sharing circuit is configured to cross a clock domain crossing between a first clock domain that includes the first credit distribution circuit and a second clock domain that includes the second credit distribution circuit.

4. The system of claim 2, wherein the first credit distribution circuit is configured to provide the at least some energy credits to the second credit distribution circuit by sending an indication of the unused energy credits to a memory device of the credit sharing circuit.

5. The system of claim 2, wherein the credit sharing circuit includes a credit accumulation circuit configured to accumulate one or more indications of unused energy credits.

6. The system of claim 1, wherein the first credit distribution circuit is configured to provide the at least some energy credits to the second credit distribution circuit without the first budget creation circuit or the second budget creation circuit receiving an indication of the unused energy credits.

7. The system of claim 1, wherein the processor cores of the first subset have design characteristics corresponding to a first frequency that differ from design characteristics of the processor cores of the second subset.

8. The system of claim 1, wherein the first budget creation circuit is configured to determine the first portion of energy credits based on a predetermined credit budget indicator stored at the first budget creation circuit.

9. The system of claim 1, wherein the first credit distribution circuit is further configured, in response to receiving an indication of energy credits from the second credit distribution circuit, to prevent an indication of the energy credits from being sent back to the second credit distribution circuit.

10. The system of claim 1, wherein a particular processor core of the plurality of processor cores is configured to:

determine, based on a remaining number of energy credits for the particular processor core, whether to perform one or more pipeline operations at the particular processor core; and deduct, based on the particular processor core determining to perform the one or more pipeline operations, one or more energy credits from a remaining quantity of energy credits allocated to the particular processor core.

11. A system, comprising:

a plurality of processor cores connected to at least one energy source, wherein the plurality of cores are configured to regulate energy consumption using energy credits;

at least one budget creation circuit configured to determine a respective portion of energy credits of a total credit budget of the energy source; and a plurality of credit distribution circuits, wherein the plurality of credit distribution circuits are configured to distribute the respective portions of the total credit budget to respective subsets of the plurality of processor cores, and wherein the plurality of credit distribution circuits are configured to share unused energy credits of the respective portions of the total credit budget with other credit distribution circuits of the plurality of credit distribution circuits without sending an indication of the unused energy credits to the at least one budget creation circuit;

wherein the plurality of processor cores are connected to the energy source via a voltage rail, and wherein the system further includes a rail separation circuit configured to separate a first credit distribution circuit of the plurality of credit distribution circuits and a respective first subset of the plurality of processor cores from a second credit distribution circuit and a respective second subset of the plurality of processor cores.

12. The system of claim 11, wherein the total credit budget is calculated based on at least one of: a current power state, a desired maximum aggregate energy consumption rate of the plurality of processor cores, or a leakage estimate of the plurality of processor cores.

13. The system of claim 11, further comprising one or more devices connected to the energy source and configured to regulate energy consumption using energy credits, wherein the plurality of credit distribution circuits are further configured to distribute at least some of the respective portions of the total credit budget to respective devices of the one or more devices.

14. The system of claim 13, wherein the one or more devices includes at least one memory device.

15. The system of claim 11, further comprising a credit sharing circuit configured to indicate a transfer of energy credits between at least two of the plurality of credit distribution circuits.

16. The system of claim 15, wherein the credit sharing circuit is configured to cross a clock domain crossing between at least two clock domains that include respective credit distribution circuits of the plurality of credit distribution circuits.

17. A non-transitory computer readable storage medium having stored thereon design information that specifies a circuit design in a format recognized by a fabrication system that is configured to use the design information to fabricate a hardware integrated circuit that includes circuitry configured to operate according to the circuit design, wherein the circuitry includes:

a plurality of processor cores connected to an energy source, wherein the plurality of processor cores are configured to regulate energy consumption using energy credits, wherein the plurality of processor cores are connected to the energy source via a voltage rail;

a rail separation circuit configured to separate the energy source from at least one of the first and second subsets of the plurality of processor cores;

a first budget creation circuit configured to determine a first portion of energy credits of a total credit budget of the energy source;

a first credit distribution circuit configured to distribute the first portion of energy credits to a first subset of the plurality of processor cores;

a second budget creation circuit configured to determine a second portion of energy credits of the total credit budget, wherein the second portion of energy credits does not include the first portion of energy credits; and a second credit distribution circuit configured to distribute the second portion of energy credits to a second subset of the plurality of processor cores, wherein the first credit distribution circuit is configured, in response to determining that at least some energy credits available to be distributed to the first subset of the plurality of processor cores will be unused, to provide the at least some energy credits to the second credit distribution circuit without sending an indication of the unused energy credits to the second budget creation circuit, and wherein the second credit distribution circuit is configured, in response to determining that at least some energy credits available to be distributed to the second subset of the plurality of processor cores will be unused, to provide the at least some energy credits to the first credit distribution circuit without sending an indication of the unused energy credits to the first budget creation circuit.

18. The non-transitory computer readable storage medium of claim 17, wherein the first subset of the plurality of processor cores have design characteristics corresponding to a first frequency, wherein the second subset of the plurality of processor cores have design characteristics corresponding to a second frequency, and wherein the first frequency is higher than the second frequency.

19. The non-transitory computer readable storage medium of claim 17, wherein the energy credits are quantified using one or more switching capacitance values.

* * * * *